US006838518B2

(12) United States Patent
Seidel et al.

(10) Patent No.: US 6,838,518 B2
(45) Date of Patent: Jan. 4, 2005

(54) EXTRUDABLE POLYCARBONATE MOLDING COMPOSITIONS

(75) Inventors: Andreas Seidel, Dormagen (DE); Klaus Kircher, Hong Kong (CN); Thomas Eckel, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 38 days.

(21) Appl. No.: 10/320,119

(22) Filed: Dec. 16, 2002

(65) Prior Publication Data

US 2003/0153658 A1 Aug. 14, 2003

(30) Foreign Application Priority Data

Dec. 20, 2001 (DE) .......................................... 101 62 747

(51) Int. Cl.⁷ ............................................... C08G 63/48
(52) U.S. Cl. ........................ 525/67; 524/141; 525/69; 525/104
(58) Field of Search ........................... 524/141; 525/67, 525/69, 104

(56) References Cited

U.S. PATENT DOCUMENTS

| 5,068,285 A | 11/1991 | Laughner | 525/67 |
| 5,087,663 A | 2/1992 | Laughner | 525/67 |
| 5,157,065 A | * 10/1992 | Fuhr et al. | 524/141 |
| 5,549,710 A | 8/1996 | Umeda et al. | 524/165 |
| 5,672,645 A | 9/1997 | Eckel et al. | 524/127 |
| 6,133,360 A | 10/2000 | Barren et al. | 524/431 |

FOREIGN PATENT DOCUMENTS

| DE | 31 49 812 | 7/1983 |
| EP | 0 496 258 | 6/2001 |
| WO | 99/57198 | 11/1999 |
| WO | 00/26287 | 5/2000 |

OTHER PUBLICATIONS

Database WPI Section Ch, Week 199637, Derwent Publications Ltd., London, GB; AN 1996–368416, XP002237143–& JP 08 176425 A (Idemitsu Petrochem Co), Jul. 9, 1996 Zusammenfassung.

Database WPI Section Ch, Week 200007 Derwent Publications Ltd., London, GB; AN 2000–075770 XP002237144–& JP 11 323118 A (Teijin Kasei Ltd), Nov. 26, 1999 Zussammenfassung.

\* cited by examiner

*Primary Examiner*—Terressa Boykin
(74) *Attorney, Agent, or Firm*—Joseph C. Gil; Aron Preis

(57) ABSTRACT

A thermoplastic molding composition comprising A) at least one member selected from the group consisting of polycarbonate and polyestercarbonate and B) a phosphorus compound is disclosed. The composition wherein A) is a mixture of (A.1) 99.9 to 40 wt. % of branched member, and (A.2) 0.1 to 60 wt. % of linear member, is characterized by high melt stability and improved mechanical properties, particularly improved stress crack resistance under the effect of chemicals and a higher notched impact resistance. The composition is especially suitable for producing profiles, films or sheets of any type in an extrusion process.

20 Claims, No Drawings

EXTRUDABLE POLYCARBONATE MOLDING COMPOSITIONS

FIELD OF THE INVENTION

The invention relates to thermoplastic molding compositions and more particularly to impact resistant polycarbonate compositions.

SUMMARY OF THE INVENTION

A thermoplastic molding composition comprising A) at least one member selected from the group consisting of polycarbonate and polyestercarbonate and B) a phosphorus compound is disclosed. The composition wherein A) is a mixture of (A.1) 99.9 to 40 wt. % of branched member, and (A.2) 0.1 to 60 wt. % of linear member, is characterized by high melt stability, as indicated by low melt flow index MFI and improved mechanical properties, particularly improved stress crack resistance under the effect of chemicals and a higher notched impact resistance. The composition is especially suitable for producing profiles, films or sheets of any type in an extrusion process. Sheets extruded from the compositions are suitable for use in thermoforming processes.

BACKGROUND OF THE INVENTION

The molding compositions described in WO 99/57198 contain aromatic polycarbonates, rubber-modified graft copolymers, and phosphorus-containing flame retardant agent with the proviso that the fluorine content of the mixture does not exceed 0.1 wt. %. It is mentioned in general terms that both linear and branched aromatic polycarbonates may be used, the relative amounts of these polycarbonates are not mentioned.

DE-A 3 149 812 describes thermoplastic molding compositions with improved processability which contain branched polycarbonates and graft polymers of the ABS, AES and ASA type. Specific flame retardants are not mentioned.

EP-B 496 258 describes compositions which contain a polycarbonate branched with a specific branching agent and other polymer components such as, for example, styrene resin, polyamide, polyolefins and rubber-like elastomers. Specific flame retardants are not mentioned. EP-B 496 258 has the objective of providing polycarbonate compositions with good melt flowability, solvent resistance and toughness.

U.S. Pat. No. 5,087,663 and U.S. Pat. No. 5,068,285 describe branched polycarbonates and mixtures of these with linear polycarbonates, mixed with ABS or ASA polymers and MBS polymers, which have good blow-molding or thermoforming characteristics. Specific flame retardants are not mentioned.

EP-A 625 547 describes flame-resistant polycarbonate compositions based on mixtures of linear and branched polycarbonates which contain specific metal salts and polyorganosiloxanes.

The object of the present invention is to provide impact resistant modified polycarbonate molding compositions which are characterized by improved ESC behavior and an improved notched impact resistance and are suitable for processing in an extrusion process due to the high melt stability.

It was found that an improvement in the notched impact resistance and ESC behavior may be produced, with a comparable high melt volume rate (MVR), giving an indication of equivalent melt stability, by adding limited amounts of linear polycarbonate to PC/ABS molding compositions based on branched polycarbonate which contain phosphorus compounds. The melt stability remains high and largely unchanged due to the addition of linear polycarbonate, although addition of an unbranched polycarbonate would be expected to produce a reduction in the melt stability.

The present invention provides compositions which contain polycarbonate and/or polyestercarbonate A) and at least one phosphorus compound B), characterized in that component A) is a mixture of 99.9 to 40, preferably 99 to 50, in particular 95 to 70 wt. %, very particularly preferably 90 to 80 wt. % of branched polycarbonate and/or polyestercarbonate A.1) and 0.1 to 60, preferably 1 to 50, in particular 5 to 30, very particularly preferably 10 to 20 wt. % (each with respect to component A)) of linear polycarbonate and/or polyestercarbonate A.2).

The compositions preferably contain rubber-modified vinyl (co)polymers C).

Particularly preferred compositions contain 40 to 99.99, preferably 50 to 99, in particular 60 to 95 parts by wt. of component A), 0.01 to 60, preferably 0.01 to 30, particularly preferably 0.05 to 20 parts by wt., very particularly preferably 0.1 to 15 parts by wt., most preferably 2 to 15 parts by wt., of at least one phosphorus compound B), and 0 to 60, preferably 0.5 to 50, in particular 1 to 30 parts by wt., particularly preferably 2 to 25 parts by wt., very particularly preferably 3 to 15 parts by wt., of rubber modified vinyl (co)polymer C).

The weight data in this application are standardized in such a way that the sum of the parts by weight of all the components, i.e., components A), B), C) and optionally other additives as in the following described as components D) and E) in the composition add up to 100.

Component A

Suitable linear and branched aromatic polycarbonates and/or aromatic polyester carbonates according to the invention in accordance with component A are known from the literature or may be prepared by processes known from the literature (to prepare aromatic polycarbonates see, for example, Schnell, "Chemistry and Physics of Polycarbonates", Interscience Publishers, 1964 and also DE-AS 1 495 626, DE-A 2 232 877, DE-A 2 703 376, DE-A 2 714 544, DE-A 3 000 610, DE-A 3 832 396; to prepare aromatic polyestercarbonates e.g., DE-A 3 077 934).

Aromatic polycarbonates are prepared, e.g., by reacting diphenols with carbonic acid halides, preferably phosgene and/or with aromatic dicarboxylic acid halides, preferably benzenedicarboxylic acid dihalides, by the phase interface method, optionally using chain stoppers, for example, monophenols and in the case of branched polycarbonates using compounds having functionalities of three of more as branching agents (herein branchers), for example, triphenols or tetraphenols, or also branchers with graded reactivity such as, for example, isatinbiscresol. Polycarbonates may also be prepared by the well-known melt process.

Diphenols for preparing linear and branched aromatic polycarbonates and/or aromatic polyestercarbonates are preferably those of the formula (I)

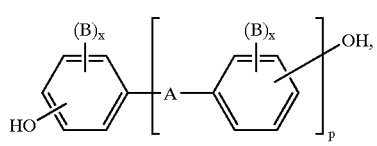

wherein

A represents a single bond, $C_1$ to $C_5$ alkylene, $C_2$ to $C_5$ alkylidene, $C_5$ to $C_6$ cycloalkylidene, —O—, —SO—, —CO—, —S—, —SO$_2$— or $C_6$ to $C_{12}$ arylene, to which other aromatic rings, optionally containing heteroatoms, may be fused, or a group of the formula (II) or (III)

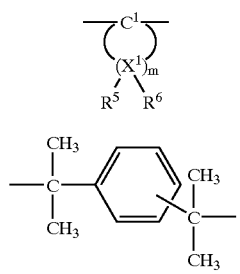

B each represents $C_1$ to $C_{12}$ alkyl, preferably methyl or halogen, preferably chlorine and/or bromine, x each independently represents 0, 1 or 2, p is 1 or 0, and $R^5$ and $R^6$ selected individually for each $X^1$, independently of each other, represent hydrogen or $C_1$ to $C_6$ alkyl, preferably hydrogen, methyl or ethyl, $X^1$ represents carbon and m is an integer from 4 to 7, preferably 4 or 5, with the proviso that $R^5$ and $R^6$ are simultaneously alkyl groups on at least one atom $X^1$.

Preferred diphenols are hydroquinone, resorcinol, dihydroxyphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and -α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenylsulfide, 4,4'-dihydroxy-diphenylsulfone, and their di- and tetrabrominated or chlorinated derivatives, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane, 2,2-bis-(4-hydroxyphenyl)-propane (bisphenol A) is particularly preferred.

The diphenols may be used individually or as mixtures of several diphenols. The diphenols are known from the literature or are prepared using known methods.

Chain stoppers which are suitable for preparing thermoplastic aromatic branched and linear polycarbonates are, for example, phenol, p-chlorophenol, p-tert.-butylphenol or 2,4,6-tribromophenol, or else long-chain alkyl phenols such as 4-(1,3-tetramethylbutyl)-phenol in accordance with DE-A 2 842 005 or monoalkylphenols or dialkylphenols with a total of 8 to 20 carbon atoms in the alkyl substituents such as 3,5-di-tert.-butyl-phenol, p-iso-octylphenol, p-tert.-octylphenol, p-dodecylphenol and 2-(3,5-dimethylheptyl)-phenol and 4-(3,5-dimethylheptyl)-phenol. The amount of chain stoppers used is generally between 0.5 mol. % and 10 mol. %, with respect to the sum of the moles of the diphenols used.

The relative solution viscosity (ηrel) of the aromatic linear polycarbonates and polyestercarbonates are in the range of 1.18 to 1.40, preferably 1.24 to 1.35, in particular 1.28 to 1.34 (measured in solutions of 0.5 g of polycarbonate or polyestercarbonate in 100 ml of methylene chloride solution at 25° C.).

The relative solution viscosity (ηrel) of the aromatic branched polycarbonates and polyestercarbonates are in the range 1.18 to 1.40, preferably 1.24 to 1.35, in particular 1.28 to 1.34 (measured in solutions of 0.5 g of polycarbonate or polyestercarbonate in 100 ml of methylene chloride solution at 25° C.).

Thermoplastic aromatic branched polycarbonates are obtained in a known manner by incorporating 0.01 to 2 mol. %, preferably 0.05 to 1 mol. %, in particular 0.1 to 0.5 mol. %, with respect to the sum of the diphenols used, of compounds having functionalities of three or more, for example those with three or more phenolic groups.

Branching agents which may be used are, for example, trifunctional or more than trifunctional carboxylic acid chlorides such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride or trifunctional or more than trifunctional phenols such as phloroglucine, 4,6-dimethyl-2,4,6-tri-(4-hydroxyphenyl)-heptene, 2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenyl-isopropyl]-phenoxy)-methane, or 1,4-bis-[4,4'-dihydroxytriphenyl)-methyl]-benzene. Phenolic branching agents may be initially introduced with the diphenols and acid chloride branching agents can be introduced together with the acid dichlorides.

Those trifunctional or more than trifunctional compounds in which the functional groups have a graded reactivity are preferably suitable for use as branching agents.

These are, for example, compounds which contain both phenolic hydroxyl groups and aromatic or aliphatic N—H functionalities, which enables branching via amide bonds. A preferred example of such a compound is isatinbiscresol.

Both homopolycarbonates and copolycarbonates are suitable. To prepare copolycarbonates according to the invention in accordance with component A, 1 to 25 wt. %, preferably 2.5 to 25 wt. % (with respect to the total amount of diphenols being used) of polydiorganosiloxanes with hydroxyaryloxy terminal groups may also be used. These are known (for example from U.S. Pat. No. 3,419,634) or may be prepared using methods known from the literature. The preparation of polydiorganosiloxane-containing copolycarbonates is described, for example, in DE-A 3 334 782.

Preferred polycarbonates, apart from bisphenol A homopolycarbonates, are the copolyacarbonates of bisphenol A with up to 15 mol. %, with respect to the sum of the moles of diphenols, of other diphenols mentioned as preferred or particularly preferred diphenols.

Aromatic dicarboxylic acid dihalides for preparing aromatic polyestercarbonates are preferably the diacid dichlorides of isophthalic acid, terephthalic acid, diphenylether-4, 4'-dicarboxylic acid and naphthalene-2,6-dicarboxylic acid.

Mixtures of the diacid dichlorides of isophthalic acid and terephthalic acid in the ratio between 1:20 and 20:1 are particularly preferred.

When preparing polyestercarbonates, a carbonic acid halide, preferably phosgene, is also used as a bifunctional acid derivative.

Suitable compounds for use as chain stoppers for the preparation of aromatic polyester carbonates, in addition to the monophenols already mentioned above, are their chlorocarbonates and the acid chlorides of aromatic monocarboxylic acids, which may optionally be substituted with $C_1$ to $C_{22}$ alkyl groups or with halogen atoms, and also aliphatic $C_2$ to $C_{22}$ monocarboxylic acid chlorides.

The amount of chain stoppers is 0.1 to 10 mol. % each, with respect, in the case of phenolic chain stoppers, to moles of diphenols and, in the case of monocarboxylic acid chloride chain stoppers, to moles of dicarboxylic acid dichlorides.

Hydroxycarboxylic acids may also be incorporated in the aromatic polyester carbonates.

The proportion of carbonate structural units in the thermoplastic aromatic polyestercarbonates may vary in any way at all. The proportion of carbonate groups is preferably up to 100 mol. %, in particular, up to 80 mol. %, particularly preferably up to 50 mol. %, with respect to the sum of ester groups and carbonate groups. Both the ester fraction and the carbonate fraction in the aromatic polyestercarbonates may be present in the form of blocks or randomly distributed in the polycondensate.

The thermoplastic aromatic polycarbonates and polyestercarbonates may be used on their own or in any mixture at all.

Component B

Furthermore, the compositions contain at least one phosphorus compound. Phosphorus compounds perform a variety of functions in polycarbonate compositions. P-based flame retardant additives and P-based stabilizers may be mentioned by way of example. Examples of phosphorus-containing compounds are oligomeric and monomeric phosphates and phosphonates, phosphonatoamines, inorganic phosphates, P oxides, phosphites and phosphazenes, wherein mixtures of two or more of the components mentioned may be used.

Phosphorus compounds are preferably used in the compositions according to the invention as flame retardant (FR) additives, in particular, those phosphates or phosphonates of the general formula (IV)

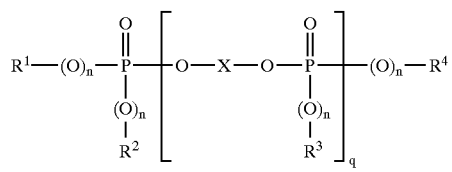

(IV)

wherein $R^1$, $R^2$, $R^3$ and $R^4$, independently, represent $C_1$–$C_8$-alkyl, $C_5$ to $C_6$ cycloalkyl, $C_6$ to $C_{20}$ aryl or $C_7$ to $C_{12}$ aralkyl, that are optionally halogenated, n independently at each site, is 0 or 1, q is 0 to 30 and X represents a mononuclear or polynuclear aromatic group with 6 to 30 carbon atoms, or a linear or branched aliphatic group with 2 to 30 carbon atoms, which may be OH-substituted and may contain up to 8 ether bonds.

$R^1$, $R^2$, $R^3$ and $R^4$, independently, preferably represent $C_1$ to $C_4$ alkyl, phenyl, naphthyl or phenyl-$C_1$–$C_4$-alkyl. Aromatic groups $R^1$, $R^2$, $R^3$ and $R^4$ may, for their part, be substituted with alkyl groups, preferably $C_1$ to $C_4$ alkyl and/or halogen. Particularly preferred aryl groups are cresyl, phenyl, xylenyl, propylphenyl or butylphenyl and the corresponding chlorinated or brominated derivatives thereof.

X in formula (IV), preferably represents a mononuclear or polynuclear aromatic group with 6 to 30 carbon atoms. This group is preferably derived from diphenols of the formula (I).

n in formula (IV) may, independently at each site, be 0 or 1; n is preferably equal to 1.

q is 0 to 30, preferably 0.5 to 15, particularly preferably 0.8 to 5, in particular 0.9 to 3, very particularly preferably 0.9 to 1.7.

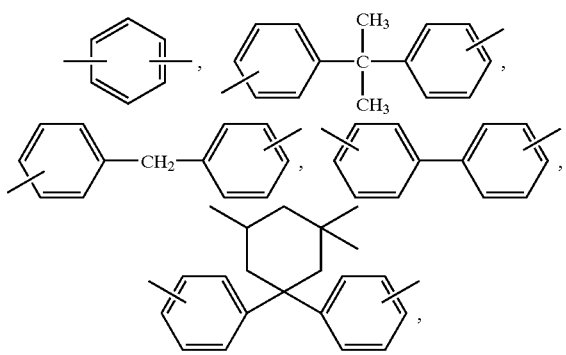

X is derived in particular from resorcinol, hydroquinone, bisphenol A or diphenylphenol. X is particularly preferably derived from bisphenol A.

Further preferred phosphorus-containing compounds are compounds of the formula (IVa)

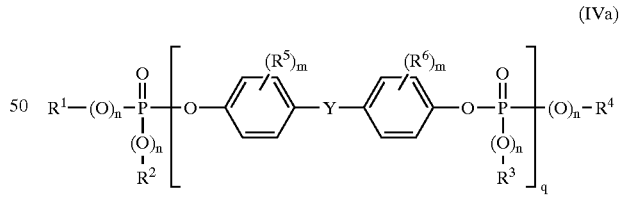

(IVa)

wherein $R^1$, $R^2$, $R^3$, $R^4$, n and q are defined in the same way as for formula (IV), m independently at each site, is 0, 1, 2, 3 or 4, $R^5$ and $R^6$, independently, represent $C_1$ to $C_4$ alkyl, preferably methyl or ethyl, and Y represents $C_1$ to $C_7$ alkylidene, $C_1$–$C_7$ alkylene, $C_5$ to $C_{12}$ cycloalkylene, $C_5$ to $C_{12}$ cycloalkylidene, —O—, —S—, —SO$_2$— or —CO—, preferably ispropylidene or methylene.

Mixtures of several components in accordance with formulas (IV) and (IVa) are preferably also used, wherein these may differ both with regard to their chemical structure and also with regard to the degree of oligomerization q. Mixtures of phosphorus-containing compounds have average q values (number average). Also, the phosphorus-containing compounds may be produced, due to the method of preparation, in the form of mixtures, the q value of which is then an average value.

The average q value of mixtures of phosphorus compounds in accordance with formulas (IV) and (IVa) may be determined by using appropriate methods (gas chromatography (GC), high pressure liquid chromatography (HPLC), gel permeation chromatography (GPC)) to determine the composition of the phosphate mixture (molecular weight distribution) and calculating the average value for q therefrom.

Monophosphates (q=0) may also be used as component B according to the invention, optionally mixed with other compounds.

Phosphorus compounds in accordance with component B are well-known (see, e.g., EP-A 0 363 608, EP-A 0 640 655) or may be prepared in an analogous way using known methods (e.g., Ullmanns Enzyklopädie der technischen Chemie, vol. 18, p. 301 et seq 1979; Houben-Weyl, Methoden der organischen Chemie, vol. 12/1, p. 43; Beilstein vol. 6, p. 177).

Component C

Molding compositions according to the invention may also contain a component C which consists of graft polymers $C_1$ of at least one vinyl monomer on at least one rubber with a glass transition temperature <10° C. as the graft substrate.

Preferred graft polymers $C_1$ are graft polymers of 5 to 95 wt. %, preferably 20 to 90 wt. % relative to the weight of the graft polymer, of a mixture of 1. 50 to 99 wt. %, in particular 50 to 90, more preferably 55 to 85, very particularly preferably 60 to 80 wt. %, relative to the weight of the mixture of vinyl aromatic compounds and/or ring-substituted vinyl aromatic compounds (such as, for example, styrene, α-methylstyrene, p-methylstyrene, p-chlorostyrene) and/or ($C_1$–$C_8$)-alkyl methacrylates (such, as methyl methacrylate, ethyl methacrylate) and
2. 1 to 50 wt. %, in particular 10 to 50, more preferably 15 to 45, very particularly preferably 20 to 40 wt. %, relative to the weight of the mixture, of vinyl cyanides (unsaturated nitrites such as acrylonitrile and methacrylonitrile) and/or ($C_1$–$C_8$)-alkyl(meth)acrylates (such as, methyl methacrylate, n-butyl acrylate, t-butyl acrylate) and/or derivatives (such as, anhydrides and imides) of unsaturated carboxylic acids (for example, maleic anhydride and N-phenylmaleic imide) on 95 to 5, preferably 80 to 10, wt. % relative to the weight of the graft polymer of one or more rubbers with glass transition temperatures <10° C., preferably <0° C., particularly preferably <−20° C. as the graft substrate.

The graft substrate generally has a median particle size (d50) of 0.05 to 10 μm, preferably 0.1 to 5 μm, in particular 0.2 to 1 μm.

The median particle size d50 is the diameter above and below which lie 50 wt. % each of the particles. It may be determined using ultracentrifuge measurements (W. Scholtan, H. Lange, Kolloid, Z. und Z. Polymere 250 (1972), 782–1796).

Preferred monomers from group 1 are at least one member selected from among styrene, α-methylstyrene and methyl methacrylate, preferred monomers from group 2 are at least one member selected from among acrylonitrile, maleic anhydride and methyl methacrylate.

Particularly preferred monomers are styrene from group 1 and acrylonitrile from group 2.

Graft substrates which are suitable for graft polymer $C_1$ are, for example, diene rubbers, EP(D)M rubbers, that is those based on ethylene/propylene and optionally diene, also acrylate, polyurethane, silicone, chloroprene and ethylene/vinylacetate rubbers as well as composite rubbers consisting of two or more of the previously mentioned rubbers.

Preferred graft substrates are diene rubbers (e.g., based on butadiene, isoprene, etc.) or mixtures of diene rubbers or copolymers of diene rubbers or their mixtures with other copolymerizable monomers (e.g. in accordance with groups 1 and 2 as listed above) such as, for example, butadiene/styrene copolymers, with the proviso that the glass transition temperature of the graft substrate is <10° C., preferably <0° C., particularly preferably <−10° C., as the graft substrate.

Polybutadiene rubber is particularly preferred.

Particularly preferred graft copolymers $C_1$ are, e.g., ABS polymers (emulsion, bulk and suspension ABS) such as are described, for example, in DE-A 2 035 390 (U.S. Pat. No. 3,644,574) or in DE-A 2 248 242 (=GB-PS 1 409 275) and in Ullmanns Enzyklopädie der technischen Chemie, vol. 19 (1980), p. 280 et seq. The proportion of gel in the graft substrate is at least 30 wt. %, preferably at least 40 wt. %.

The gel content of the graft substrate is determined at 25° C. in toluene (M. Hoffmann, H. Krömer, R. Kuhn, Polymeranalytik I und II, Georg Thieme-Verlag, Stuttgart 1977).

Graft copolymers $C_1$ are prepared by radical polymerisation, e.g., by emulsion, suspension, solution or bulk polymerisation, preferably by emulsion or bulk polymerisation.

Particularly suitable graft rubbers are also ABS polymers which are prepared by redox initiation using an initiator system consisting of organic hydroperoxide and ascorbic acid in accordance with U.S. Pat. No. 4,937,285.

Since, as is well-known, graft monomers are not absolutely and fully grafted onto the graft substrate during the graft reaction, graft polymers are also understood, according to the invention, to be those products which are obtained by (co)polymerisation of the graft monomers in the presence of the graft substrate and are produced together during processing.

Acrylate rubbers, which are suitable as graft substrates, are preferably polymers of alkyl acrylates, optionally also copolymers with up to 40 wt. %, with respect to the graft substrate, of other polymerizable ethylenically unsaturated monomers. Preferred polymerizable acrylates include the $C_1$–$C_8$-alkyl esters, for example, methyl, ethyl, butyl, n-octyl and 2-ethylhexyl esters, haloalkyl esters, preferably halogen-$C_1$–$C_8$-alkyl esters such as chloroethyl acrylate and mixtures of these monomers.

For cross-linking purposes, monomers with more than one polymerizable double bond are copolymerized. Preferred examples of cross-linking monomers are esters of unsaturated monocarboxylic acids with 3 to 8 carbon atoms and unsaturated monohydric alcohols with 3 to 12 carbon atoms, or unsaturated polyols with 2 to 4 OH groups and 2 to 20 carbon atoms such as ethylene glycol dimethacrylate; allyl methacrylate; polyunsaturated heterocyclic compounds such as trivinyl and triallyl cyanurate; polyfunctional vinyl compounds such as di- and trivinyl benzenes; but also triallyl phosphate and diallyl phthalate.

Preferred cross-linking monomers are allyl methacrylate, ethylene glycol dimethacrylate, diallyl phthalate and heterocyclic compounds which contain at least three ethylenically unsaturated groups.

Particularly preferred cross-linking monomers are the cyclic monomers triallyl cyanurate, triallyl isocyanurate, triacrylohexahydro-s-triazine and triallyl benzenes. The amount of cross-linking agent used is preferably 0.02 to 5, in particular 0.05 to 2 wt. %, with respect to the graft substrate.

In the case of cyclic cross-linking monomers with at least three ethylenically unsaturated groups, it is advantageous to restrict the amount to less than 1 wt. % of the graft substrate.

Preferred "other" polymerizable ethylenically unsaturated monomers which may optionally be used to prepare the graft substrate, in addition to acrylates, are, e.g., acrylonitrile, styrene, α-methylstyrene, acrylamide, vinyl-$C_1$–$C_6$-alkyl ethers, methyl methacrylate and butadiene.

Preferred acrylate rubbers for use as graft substrates are emulsion polymers which have a gel content of at least 60 wt. %.

Other suitable graft substrates are silicone rubbers with graft-active sites such as are described in DE-A 3 704 657, DE-A 3 704 655, DE-A 3 631 540 and DE-A 3 631 539.

Furthermore, component C may contain one or more thermoplastic vinyl (co)polymers $C_2$ in which the above mentioned graft polymers $C_1$ are preferably present in dispersed form in the composition according to the invention.

Polymers which are suitable for use as vinyl (co)polymers $C_2$ are polymers of at least one monomer from the group of vinyl aromatic compounds, vinyl cyanides (unsaturated nitriles), ($C_1$–$C_8$)-alkyl (meth)acrylates, unsaturated carboxylic acids and derivatives (such as anhydrides and imides) of unsaturated carboxylic acids. Particularly suitable (co)polymers are those consisting of:

50 to 99, preferably 60 to 80, wt. % relative to the weight of the copolymer of vinyl aromatic compounds and/or ring-substituted vinyl aromatic compounds such as, for example, styrene, α-methylstyrene, p-methylstyrene, p-chlorostyrene and/or ($C_1$–$C_8$)-alkyl methacrylates such as methyl methacrylate, ethyl methacrylate, and 1 to 50, preferably 20 to 40, wt. % relative to the weight of the copolymer of vinyl cyanides (unsaturated nitrites) such as acrylonitrile and methacrylonitrile and/or ($C_1$–$C_8$)-alkyl (meth)acrylates (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example, maleic anhydride and N-phenyl-maleic imide).

(Co)polymers C2 are resin-like and thermoplastic.

The copolymer particularly preferably consists of styrene and acrylonitrile.

(Co)polymers in accordance with C2 are known and may be prepared by radical polymerisation, in particular by emulsion, suspension, solution or bulk polymerisation. The (co)polymers preferably have average molecular weights Mw (weight average, determined by light scattering or sedimentation) between 15,000 and 200,000.

Component D

If P-based FR additives are used as component B), then these are often used in combination with so-called antidripping agents which reduce the tendency of the material to form burning droplets in the event of a fire. For example, compounds from the substance classes fluorinated polyolefins, silicones and aramide fibres may be mentioned here. These may also be used in the compositions according to the invention. Fluorinated polyolefins are preferably used as antidripping agents.

Fluorinated polyolefins are known and are described, for example, in EP-A 0 640 655. They are marketed, for example, by DuPont under the name Teflon® 30 N.

Fluorinated polyolefins may be used either in the pure form or else in the form of a coagulated mixture of emulsions of the fluorinated polyolefins with emulsions of the graft polymers (component C1) or with an emulsion of a copolymer, preferably based on styrene/acrylonitrile, wherein the fluorinated polyolefin is mixed with an emulsion of the graft polymer or the copolymer and then coagulated.

Furthermore, the fluorinated polyolefins may be used as a precompound with the graft polymer (component C1) or a copolymer (component C2), preferably based on styrene/acrylonitrile. The fluorinated polyolefins, as a powder, are blended with a powder or granulate of the graft polymer or copolymer and compounded in the melt, generally at temperatures of 200 to 330° C. in conventional equipment such as internal compounders, extruders or twin-shaft screws.

The fluorinated polyolefins may also be used in the form of a masterbatch which is prepared by emulsion polymerisation of at least one monoethylenically unsaturated monomer in the presence of an aqueous dispersion of the fluorinated polyolefin. Preferred monomer components are styrene, acrylonitrile and mixtures of these. The polymer is used as a free-flowing powder after acidic precipitation and subsequent drying.

The coagulates, precompounds or masterbatches usually have solids contents of fluorinated polyolefin of 5 to 95 wt. %, preferably 7 to 80 wt. %.

Fluorinated polyolefins are used at a concentration of 0 to 1 parts by wt., preferably 0.1 to 0.5 parts by wt., wherein the amounts of fluorinated polyolefin relates to the fluorinated polyolefins per se not including the amounts of other components in case the fluorinated polyolefins are used in form of a coagulated mixture, precompound a masterbatch.

Compositions according to the invention may also contain up to 20 parts by wt., preferably 0.1 to 10 parts by wt., of at least one conventional polymer additive such as a lubricant and mold release agent, for example pentaerythritol tetrastearate or a polyolefin, a nucleating agent, an antistatic agent, a stabilizer, a P-free FR additive, a FR synergist, e.g., a nanoscale inorganic material, or a filling and reinforcing agent, e.g., glass or carbon fibers or a mineral such as talc, mica, kaolin or wollastonite and also colorant and pigment.

Compositions according to the invention are prepared by blending the particular constituents in a known way and melt-compounding and melt-extruding at temperatures of 200° C. to 300° C. in conventional equipment such as internal compounders, extruders and twin-shaft screws.

Blending the individual constituents may be performed in a known way either in succession or simultaneously, either at about 20° C. (room temperature) or at an elevated temperature.

Compositions according to the invention may be used to produce molded items of every type. These may be produced, for example, by injection molding, extrusion and blow molding processes. Another form of processing is the production of molded items by thermoforming from previously produced sheets or films.

Examples of such molded items are films, profiles, every type of housing part, e.g., for domestic appliances such as juice presses, coffee machines, mixers; for office equipment such as monitors, printers, copiers; also sheets, tubes, cable conduits, profiles for the building sector, internal structures and external applications; parts for the electrical engineering sector such as switches and plugs and also internal and external parts for cars.

Compositions according to the invention may be used in particular, for example, to produce the following molded items:

Internal components for railway vehicles, ships, aeroplanes, buses and cars, hub caps, housings for electrical plant which contains small transformers, housings for equipment for the distribution and transmission of information, housings and coverings for medical purposes, massage equipment and housings therefor, toy vehicles for children, two-dimensional wall elements, housings for safety devices, rear spoilers, body parts for cars, thermally insulated transport containers, devices for holding or the care of small animals, molded parts for sanitary and bath fittings, covering grills for ventilation openings, molded items for garden and equipment sheds, housings for garden equipment.

In a particularly preferred way, the compositions are used to produce profiles, ducts, tubes, sheets, which can be further processed by thermoforming to give molded parts, and films in an extrusion process.

The following examples are used to explain the invention in more detail.

EXAMPLES

The components cited in table 1 and briefly explained in the following are melt-compounded at 260° C. on a ZSK-25. The test specimens were produced at 260° C. using an injection molding machine of the Arburg 270 E type.

Components

Component A1

A branched polycarbonate based on bisphenol A with a relative solution viscosity $\eta$ rel=1.31, measured in $CH_2Cl_2$ as solvent at 25° C. and at a concentration of 0.5 g/100 ml, which was branched by using 0.3 mol. % of isatinbiscresol, with respect to the sum of bisphenol A and isatinbiscresol.

Component A2

A linear polycarbonate based on bisphenol A with a relative solution viscosity $\eta$rel=1.31, measured in $CH_2Cl_2$ as solvent at 25° C. and at a concentration of 0.5 g/100 ml.

Component B

A bisphenol A-based oligophosphate

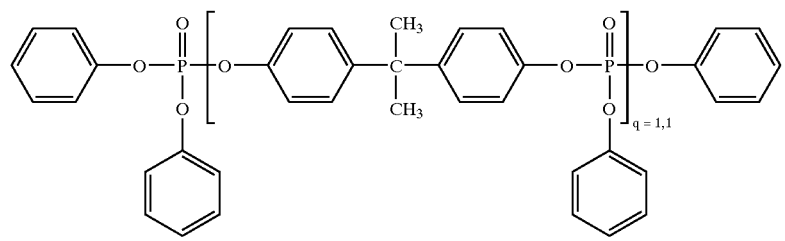

To determine the cited number average value of q, the proportions of oligomeric phosphates are first determined by HPLC measurement:

| | |
|---|---|
| Column type: | LiChrosorp RP-8 |
| Eluant in gradients: | acetonitrile/water 50:50 to 100:0 |
| Concentration: | 5 mg/ml |

The number weighted q averages are then calculated from the proportions of the individual components (mono and oligophosphates) using known methods.

Component C

An emulsion polymer prepared by grafting 40 parts by wt. of a mixture of styrene and acrylonitrile in the ratio 73:27 onto 60 parts by wt. of particulate cross-linked polybutadiene rubber (mean particle diameter $d_{50}$=0.3 µm).

Component D

A tetrafluoroethylene polymer (PTFE) as a coagulated mixture of a graft polymer emulsion in accordance with component C mentioned above in water and a tetrafluoroethylene polymer emulsion in water. The ratio by weight of graft polymer C to tetrafluoroethylene polymer in D was 90 wt. % to 10 wt. %. The tetrafluoroethylene polymer emulsion had a solids content of 60 wt. %. The graft polymer emulsion had a solids content of 34 wt. %.

The emulsion of tetrafluoroethylene polymer (Teflon® 30N) was blended with the emulsion of the graft polymer and stabilized with 1.8 wt. %, with respect to polymer solids, of phenolic antioxidants. The mixture was coagulated at 85 to 95° C. using an aqueous solution of MgSO4 (Epsom salts) and acetic acid at pH 4 to 5, filtered and washed until virtually electrolyte-free, then the majority of the water was removed by centrifuging and the mixture then dried at 100° C. to give a powder.

Component E1

A phosphite stabilizer.

Component E2

Pentaerythritol tetrastearate (PETS) as a mold release agent and lubricant.

Component E3

Titanium dioxide as a white pigment.

Testing the molding compositions according to the invention

The thermal dimensional stability is determined according to Vicat B in accordance with DIN 53 460 (ISO 306) using specimens with the dimensions 80 mm×10 mm×4 mm.

The notched impact resistance ak was determined at room temperature in accordance with ISO 180/1 A.

The flame resistance of the composition was measured according to UL 94 V, using specimens of thickness 1.6 mm.

The stress crack behavior (ESC behavior) is tested on specimens with the dimensions 80 mm×10 mm×4 mm. A mixture of 60 vol. % toluene and 40 vol. % isopropanol was used as the test medium. The test items were prestretched (pre-extension as a percentage) using an arc-shaped jig and stored in the test medium at room temperature. The stress crack behavior in the test medium was assessed from the formation of cracks or fractures as a function of the pre-extension ($\epsilon_x$).

The MVR (melt volume rate) is determined at 260° C. using a plunger load of 5 kg, in accordance with ISO 1133.

A summary of the properties of compositions according to the invention or the molded items obtained therefrom is given in Table 1.

TABLE 1

Compositions and their properties

| Components [parts by wt.] | C1 comp. | C2 comp. | Example 1 | 2 | 3 | 4 |
|---|---|---|---|---|---|---|
| A1 | 81.48 | — | 73.33 | 65.19 | 57.04 | 40.74 |
| A2 | — | 81.48 | 8.15 | 16.30 | 24.44 | 40.74 |
| B | 9.70 | 9.70 | 9.70 | 9.70 | 9.70 | 9.70 |
| Emulsion polymer of C and D | 4.49 | 4.49 | 4.49 | 4.49 | 4.49 | 4.49 |
| PTFE from D | 0.13 | 0.13 | 0.13 | 0.13 | 0.13 | 0.13 |
| E1 | 0.10 | 0.10 | 0.10 | 0.10 | 0.10 | 0.10 |
| E2 | 0.19 | 0.19 | 0.19 | 0.19 | 0.19 | 0.19 |
| E3 | 3.91 | 3.91 | 3.91 | 3.91 | 3.91 | 3.91 |
| Properties | | | | | | |
| $a_k$ (23° C.) [kJ/m²] | 44 | 54 | 44 | 45 | 47 | 48 |
| Vicat B120 [° C.] | 114 | 115 | 115 | 115 | 115 | 114 |
| MVR 260° C./5 kg [ccm/10 min] | 12.9 | 16.7 | 12.8 | 13.0 | 13.6 | 14.8 |
| UL 94 V 1.6 mm | V0 | V0 | V0 | V0 | V0 | V0 |
| ESC behavior fracture within 5 min at $\epsilon_x$ | 1.0% | 1.4% | 1.2% | 1.2% | 1.2% | 1.2% |

It can be seen from Table 1 that compositions in accordance with the present invention, with comparable melt stability (MVR), have better stress crack resistance and notched impact resistance than comparison Example 1 with exclusively branched polycarbonate. Furthermore, it can be seen from table 1 that, despite the addition of limited amounts of linear polycarbonate to the molding compositions with branched polycarbonate, the melt stability remains high (low MVR value).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) at least one member selected from the group consisting of polycarbonate and polyestercarbonate and
   B) a phosphorus compound,
   wherein A) is a mixture of
      (A.1) 99.9 to 40 wt. % of branched member, and
      (A.2) 0.1 to 60 wt. % of linear member,
   the percents, both occurrences with respect to A).

2. The composition according to claim 1 wherein (A.1) is present in an amount of 95 to 70 wt. % and (A.2) is present in an amount of 5 to 30 wt. %.

3. The composition according to claim 1 wherein A is present in an amount of 40 to 99.99 parts by wt. and B is present in an amount of 0.01 to 60 parts by wt., the total of A and B being 100 parts by weight.

4. The composition according to claim 1 containing 40 to 99.99 parts by wt. of A), 0.01 to 30 parts by wt. of B) and 0 to 60 parts by wt. of rubber-modified vinyl (co)polymer, C), wherein the sum of the parts by weight of components A), B) and C) and optionally other additives totals 100.

5. The composition according to claim 4 containing 50 to 99 parts by wt. of A), 0.05 to 20 parts by wt. of B) and 0.5 to 50 parts by wt. of C).

6. The composition according to claim 5 containing 60 to 95 parts by wt. of A), 0.1 to 15 parts by wt. of B) and 1 to 30 parts by wt. of C).

7. The composition according to claim 1 wherein phosphorus compound is at least one member selected from the group consisting of oligomeric and monomeric phosphates, phosphonates, phosphonatoamines, phosphites, inorganic phosphates, phosphorus oxides and phosphazenes.

8. A thermoplastic molding composition comprising
   A) at least one member selected from the group consisting of polycarbonate and polyestercarbonate and
   B) a phosphorus compound selected from the group consisting of phosphates and phosphonates of the formula (IV)

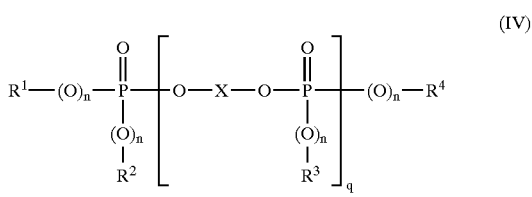

and formula (IVa)

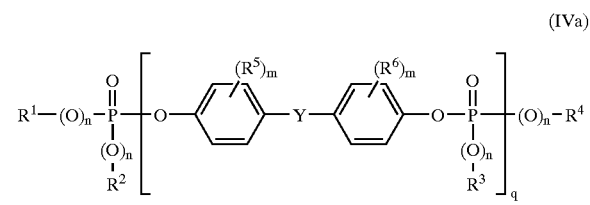

wherein
   $R^1, R^2, R^3, R^4$ independently, represent $C_1$ to $C_8$ alkyl, $C_5$ to $C_6$ cycloalkyl, $C_6$ to $C_{20}$ aryl or $C_7$ to $C_{12}$ aralkyl,
   n independently at each site, is 0 or 1,
   q is 0 to 30 and
   m independently at each site, is 0, 1, 2, 3 or 4,
   $R^5$ and $R^6$, independently, represent $C_1$ to $C_4$ alkyl, and
   Y represents $C_1$ to $C_7$ alkylidene, $C_1$–$C_7$ alkylene, $C_5$ to $C_{12}$ cycloalkylene, $C_5$ to $C_{12}$ cycloalkylidene, —O—, —S—, —SO$_2$— or —CO—
   and
   X represents a mononuclear or polynuclear aromatic group with 6 to 30 carbon atoms, or a linear or branched aliphatic group with 2 to 30 carbon atoms
   and wherein A) is a mixture of
      (A.1) 99.9 to 40 wt.% of branched member, and
      (A.2) 0.1 to 60 wt.% of linear member,
   the percents, both occurrences with respect to A).

9. The composition according to claim 8, wherein X represents a member selected from the group consisting of

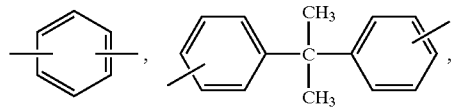

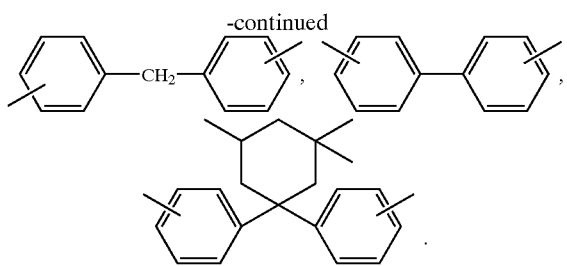

10. The composition according to claim 8 wherein q is 0.5 to 15.

11. The composition according to claim 9, wherein q is 0.8 to 5.

12. The composition according to claim 8 wherein B) conforms to formula (IVa)

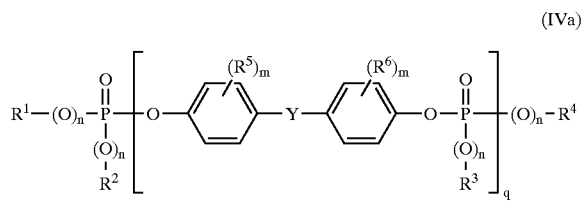

wherein $R^1, R^2, R^3, R^4$ independently, represent $C_1$ to $C_8$ alkyl, $C_5$ to $C_6$ cycloalkyl, $C_6$ to $C_{20}$ aryl or $C_7$ to $C_{12}$ aralkyl, n independently at each site, is 0 or 1, q is 0 to 30 and m independently at each site, is 0, 1, 2, 3 or 4, $R^5$ and $R^6$, independently, represent $C_1$ to $C_4$ alkyl, and Y represents $C_1$ to $C_7$ alkylidene, $C_1$–$C_7$ alkylene, $C_5$ to $C_{12}$ cycloalkylene, $C_5$ to $C_{12}$ cycloalkylidene, —O—, —S—, —SO$_2$— or —CO—.

13. The composition according to claim 1 further containing C) one or more graft polymers of 5 to 95 wt. % of at least one vinyl monomer on 95 to 5 wt. % of a graft substrate having glass transition temperature <10° C.

14. The composition according to claim 13, wherein the graft substrate is at least one rubber selected from the group consisting of diene, EP(D)M, acrylate and silicone.

15. The composition according to claim 13, wherein the graft substrate is at least one rubber selected from the group consisting of polybutadiene, butadiene/styrene copolymers and acrylate.

16. The composition according to claim 1 further containing up to 1 part by wt. relative to the weight of the composition of fluorinated polyolefin.

17. The composition according to claim 1 further containing at least one additive selected from the group consisting of lubricant, mold release agent, nucleating agent, antistatic agent, stabilizer, phosphorus-free flame retardant additive, flame retardant synergist, filler, reinforcing agent, colorant and pigment.

18. A method of using the composition according to claim 1 comprising producing a molded article.

19. The molded article produced by the method of claim 18.

20. A molded article comprising the composition of claim 1.

* * * * *